United States Patent
Wu et al.

(10) Patent No.: US 9,536,562 B1
(45) Date of Patent: Jan. 3, 2017

(54) METHOD AND APPARATUS FOR IMITATING A DEFECT IN A READ-BACK SIGNAL RECEIVED FROM A ROTATING STORAGE MEDIUM

(71) Applicant: Marvell International Ltd., Hamilton (BM)

(72) Inventors: Zining Wu, Los Altos, CA (US); Shaohua Yang, San Jose, CA (US)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 14/873,233

(22) Filed: Oct. 2, 2015

Related U.S. Application Data

(62) Division of application No. 11/895,399, filed on Aug. 24, 2007, now Pat. No. 9,153,270.

(60) Provisional application No. 60/824,156, filed on Aug. 31, 2006.

(51) Int. Cl.
| | |
|---|---|
| *G11B 20/18* | (2006.01) |
| *G11B 5/012* | (2006.01) |
| *G11B 5/02* | (2006.01) |
| *G11B 19/04* | (2006.01) |

(52) U.S. Cl.
CPC ........... *G11B 20/1816* (2013.01); *G11B 5/012* (2013.01); *G11B 5/02* (2013.01); *G11B 19/048* (2013.01)

(58) Field of Classification Search
None
See application file for complete search history.

(56) References Cited

U.S. PATENT DOCUMENTS

| | | | |
|---|---|---|---|
| 5,629,914 | A | 5/1997 | Clark et al. |
| 5,761,169 | A | 6/1998 | Mine et al. |
| 6,034,831 | A | 3/2000 | Dobbek et al. |
| 6,772,386 | B2 | 8/2004 | Iwata et al. |
| 2003/0137912 | A1 | 7/2003 | Ogura |
| 2004/0190414 | A1 | 9/2004 | Iwata et al. |
| 2006/0044978 | A1 | 3/2006 | Oh |

*Primary Examiner* — Brian Butcher

(57) ABSTRACT

A read channel module including an input, a location module and a generation module. The input is configured to receive a read-back signal from a rotating storage medium. The location module is configured to determine a location to insert a first imitation defect within the read-back signal. The first imitation defect imitates a first defect. The generation module is configured to (i) selectively generate the first imitation defect, and (ii) insert the first imitation defect in the read-back signal at the determined location.

20 Claims, 7 Drawing Sheets

METHOD AND APPARATUS FOR
IMITATING A DEFECT IN A READ-BACK
SIGNAL RECEIVED FROM A ROTATING
STORAGE MEDIUM

CROSS-REFERENCE TO RELATED APPLICATIONS

This application is a divisional of U.S. Non-Provisional application Ser. No. 11/895,399, filed on Aug. 24, 2007 which claims the benefit of U.S. Provisional Application No. 60/824,156, filed on Aug. 31, 2006. The disclosures of the above applications are incorporated herein by reference in their entirety.

FIELD

The present disclosure relates to rotating storage devices, and more particularly to read/write channel modules.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIGS. 1 and 2, a rotating data storage device stores data either magnetically or optically in a rotating medium. For example, rotating storage devices include a hard disk drive (HDD), a compact disc (CD) drive, a digital versatile disc (DVD) drive or a high definition/high data storage disc drive. A HDD system 10 may include read and write channel modules 12, 14 that enable a read/write head or read/write device (both not shown) to write data to a channel/storage medium 16 and to read-back the data. The channel/storage medium 16 may include one or more magnetic disks.

The write channel module 14 may include an encoder module 18 to encode data u(t) and write channel sub-modules 20 to modulate and otherwise prepare the data for storage. Data storage may be affected by internal or external shock, dirt, imperfections on the disk, etc. that may be collectively represented as noise n.

The read channel module 12 may include read channel sub-modules 22 that receive and process read-back data from the channel storage medium 16. The read channel sub-modules 22 may include an analog-to-digital converter (ADC), filters, timing recovery modules, and equalizers. Detector and decoder modules 24 of the read channel module 12 may detect and decode the read-back data.

Referring to FIG. 2, hard disks may include tracks that store data. The tracks are divided into data sectors. Servo numbers may identify servo areas between wedges. A data sector 50 may include a preamble field 52, a sync mark (SM) field 54, a data field 56, and a postamble field 58.

An acquisition preamble is typically recorded in the preamble field 52 to enable the read channel module 12 to acquire the appropriate timing and amplitude information from the read-back signal. The preamble field 52 is also used to lock a clock phase and frequency of a timing loop and to synchronize data that may be in the data field 56. The SM field 54 includes sync-mark data that marks the ending point of the preamble field 52 and the starting point of the data field 56. The SM field 54 may include the same value for all sectors and may be used as a reference point for the position of data throughout the data track. The postamble field 140 is appended to the data sector to help protect the data from detection errors during sector termination.

Due to defects on the media and write/read imperfectness, the read back signal can contain dramatic amplitude fluctuation and cause detection errors or read failures.

SUMMARY

A defect emulator module for a rotating storage device includes a coefficient module that generates a first coefficient. A location module generates a location. A defect signal module selectively modifies a read-back signal based on the first coefficient and the location. The first coefficient includes an emulation of a first defect in the read-back signal.

In other features, the defect emulator module includes a counter module that identifies the location based on a sync-mark (SM) found signal. The defect signal module modifies the read-back signal based on the first coefficient and the location when the counter module reaches a location count corresponding to the location. The defect emulator module further includes a length module that generates a defect length.

In other features, a length module generates a defect length count. The defect signal module modifies the read-back signal with the first coefficient until the counter module reaches the location count plus the defect length count. At least one of the location and the length is randomly generated. The coefficient module generates a second coefficient, and the location module generates a second location. The defect signal module modifies the read-back signal based on the second coefficient and the second location. The second coefficient includes an emulation of a second defect in the read-back signal. The first defect has a magnitude that varies during the modification of the read-back signal.

In other features, a read channel module includes the defect emulator module and further includes a defect detector module that detects the modified read-back signal. A detector evaluation module evaluates an output from the defect detector module based on the first coefficient. A modifier modifies the read-back signal based on the first coefficient, and a sync-mark (SM) found module generates a SM found signal. The location for the first defect is found after generation of the SM found signal. The rotating storage device is selected from a group consisting of a hard disk drive (HDD), a compact disc (CD) drive, a digital versatile disc (DVD) drive, and a high definition/high data storage disc drive.

In other features, a read channel module for a rotating storage device includes an input that receives a read-back signal from a rotating storage medium of the rotating storage device. The read-back signal includes control portions and a data portion. A defect emulator module selectively generates a first defect that modifies a first portion of the data portion of the read-back signal. The defect emulator module includes a coefficient generator module that generates a first defect coefficient for the first defect. The defect emulator module also includes a location module that generates a first location for the first defect. A length module generates a first length of the first defect.

In other features, the coefficient generator module generates a second defect coefficient for a second defect for a second portion of the read-back signal. The location module generates a second location for the second defect, and the length module generates a second length for the second defect. The first defect coefficient has a magnitude that varies during the first defect. The read channel module further includes a sync-mark (SM) found module that generates a SM found signal. The defect emulator module modifies the first portion of the data portion based on the SM found signal.

In other features, a defect emulator module for a rotating storage device includes a coefficient module that generates a first coefficient that emulates a first defect in a read-back signal. A location module generates a location of the first defect in the read-back signal. A defect signal module selectively modifies the read-back signal based on the first coefficient and the location.

In other features, the defect emulator module further includes a counter module that identifies the location based on a sync-mark (SM) found signal. The defect signal module modifies the read-back signal based on the first coefficient and the location when the counter module reaches a location count corresponding to the location. A length module generates a defect length and a defect length count. The defect signal module modifies the read-back signal with the first coefficient until the counter module reaches the location count plus the defect length count.

In other features, at least one of the location and the length is randomly generated. The coefficient module generates a second coefficient that emulates a second defect in the read-back signal. The location module generates a second location, and the defect signal module modifies the read-back signal based on the second coefficient and the second location. The first defect has a magnitude that varies during the modification of the read-back signal.

In other features, a method for modifying a read-back signal from a rotating storage device includes generating a first coefficient that emulates a first defect in the read-back signal. The method also includes generating a location and modifying the read-back signal based on the first coefficient and the location. The method also includes identifying the location based on a sync-mark (SM) found signal. The method also includes modifying the read-back signal based on the first coefficient and the location when the counter module reaches a location count corresponding to the location.

In other features, the method includes generating a defect length. The method also includes generating a defect length count and modifying the read-back signal with the first coefficient until the location count plus the defect length count is reached. The method also includes generating at least one of the location and the length randomly. The method also includes generating a second coefficient that emulates a second defect in the read-back signal and generating a second location. The method also includes modifying the read-back signal based on the second coefficient and the second location. The first defect has a magnitude that varies during the modification of the read-back signal.

In other features, the method includes detecting the modified read-back signal and evaluating the modified read-back signal based on the first coefficient. The method also includes modifying the read-back signal based on the first coefficient. The method also includes generating a sync-mark (SM) found signal. The location for the first defect is determined following generation of the SM found signal. The rotating storage device is selected from a group consisting of a hard disk drive (HDD), a compact disc (CD) drive, a digital versatile disc (DVD) drive, and a high definition/high data storage disc drive.

In other features, a method for reading from a rotating storage medium of a rotating storage device includes receiving a read-back signal from the rotating storage medium. The read-back signal includes control portions and a data portion. The method also includes generating a first defect selectively, where in the first defect modifies a first portion of the data portion of the read-back signal. The method also includes generating a first defect coefficient for the first defect, generating a first location for the first defect, and generating a first length of the first defect.

In other features, the method includes generating a second defect coefficient for a second defect for a second portion of the read-back signal. The method also includes generating a second location for the second defect and generating a second length for the second defect. The first defect coefficient has a magnitude that varies during the first defect. The method also includes generating a sync-mark (SM) found signal and modifying the first portion of the data portion based on the SM found signal.

In other features, a defect emulator module for a rotating storage device includes coefficient means for generating a first coefficient and location means for generating a location. The defect emulator module also includes defect signal means for selectively modifying a read-back signal based on the first coefficient and the location. The first coefficient includes an emulation of a first defect in the read-back signal. The defect emulator module further includes counter means for identifying the location based on a sync-mark (SM) found signal.

In other features, the defect signal module modifies the read-back signal based on the first coefficient and the location when the counter means reaches a location count corresponding to the location. The defect emulator module further includes length means for generating a defect length. The defect emulator module further includes length means for generating a defect length count. The defect signal module modifies the read-back signal with the first coefficient until the counter means reaches the location count plus the defect length count. At least one of the location and the length is randomly generated.

In other features, the coefficient means generates a second coefficient, and the location means generates a second location. The defect signal means modifies the read-back signal based on the second coefficient and the second location. The second coefficient includes an emulation of a second defect in the read-back signal. The first defect has a magnitude that varies during the modification of the read-back signal.

In other features, a read channel module includes the defect emulator module and further includes defect detector means for detecting the modified read-back signal. The read channel module also includes detector evaluation means for evaluating an output from the defect detector module based on the first coefficient. The read channel also includes modifier means for modifying the read-back signal based on the first coefficient. Sync-mark (SM) found means generate a SM found signal, and the location for the first defect follows generation of the SM found signal. The rotating storage device is selected from a group consisting of a hard disk drive (HDD), a compact disc (CD) drive, a digital versatile disc (DVD) drive, and a high definition/high data storage disc drive.

In other features, a read channel module for a rotating storage device includes input means for receiving a read-back signal from a rotating storage medium of the rotating storage device. The read-back signal includes control portions and a data portion. The read channel module also includes defect emulator means for selectively generating a first defect that modifies a first portion of the data portion of the read-back signal. The defect emulator means includes coefficient generator means for generating a first defect coefficient for the first defect. The defect emulator means also includes location means for generating a first location for the first defect and length means for generating a first length of the first defect.

In other features, the coefficient generator means generates a second defect coefficient for a second defect for a second portion of the read-back signal, and the location means generates a second location for the second defect. The length means generates a second length for the second defect. The first defect coefficient has a magnitude that varies during the first defect. The read channel module further includes sync-mark (SM) found means for generating a SM found signal. The defect emulator means modifies the first portion of the data portion based on the SM found signal.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
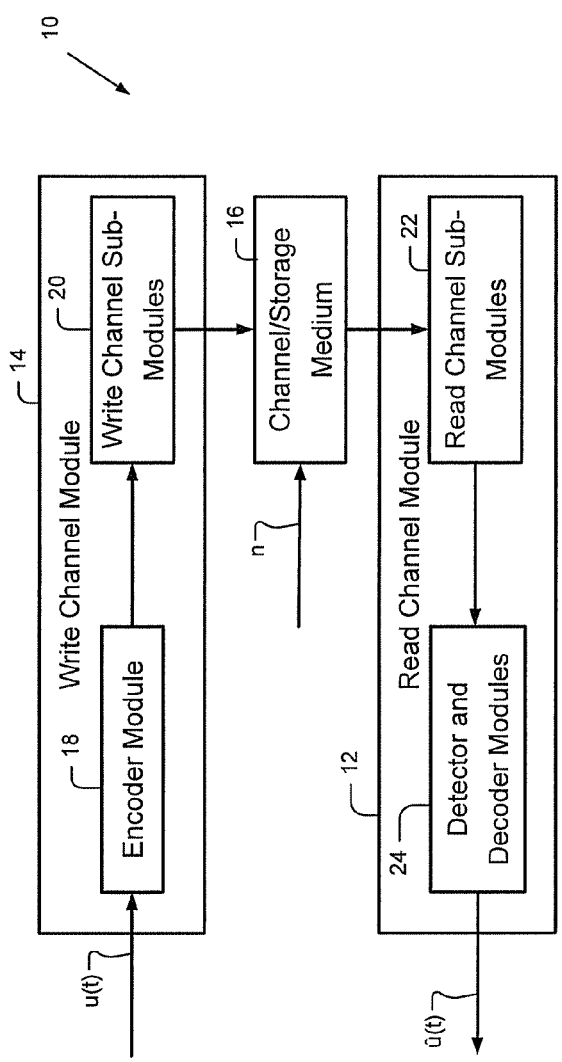
FIG. 1 is a functional block diagram of a hard disk drive system according to the prior art.
Figure 2:
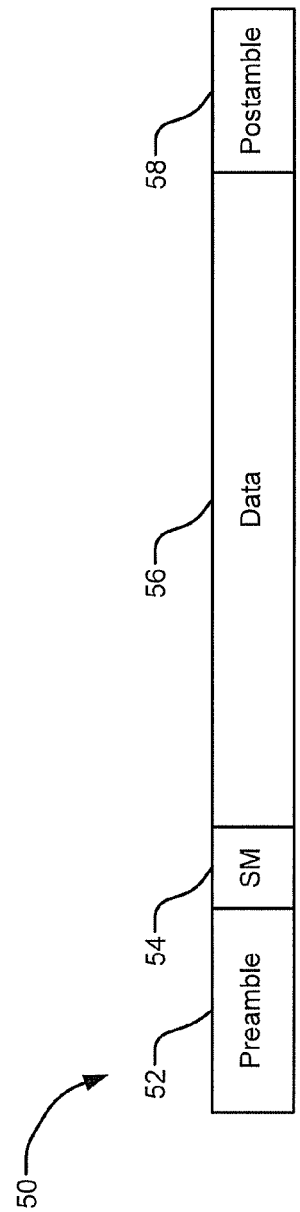
FIG. 2 is a block diagram of a data sector according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A defect emulation module inserts a defect in a read-back signal from a rotating storage medium. A defect detector module detects the modified read-back signal. A detector evaluation module evaluates performance of the defect detector module based on defect detector module and defect emulator module signals.

Figure 3:
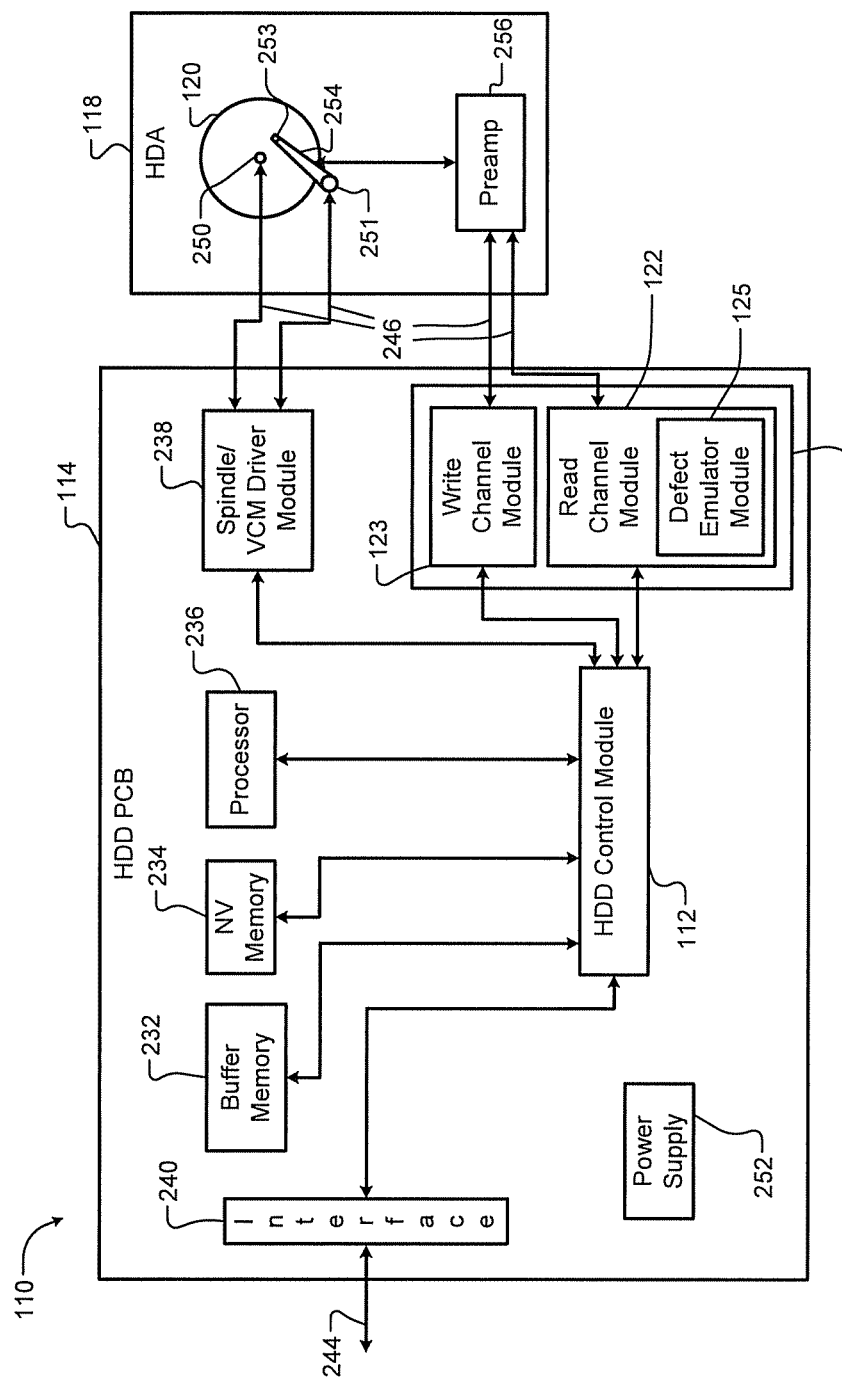
FIG. 3 disclosure is a functional block diagram of a hard disk drive (HDD) according to the present disclosure.

Referring now to FIG. 3, a functional block diagram of a hard disk drive (HDD) system 110 including a HDD control module 112 is shown. The HDD system 110 also includes a HDD printed circuit board (PCB) 114 that is coupled to a host system (not shown) and a hard disk assembly (HDA) 118. The HDD PCB 114 reads from and writes to wedges of a rotating storage medium 120 of the HDA 118 via read and write channel modules 122, 123 (collectively read/write channel module 124) that communicate with the HDD control module 112. The write channel module 123 processes and transmits data to the HDA 118 during a write operation. The read channel module 122 receives, during a read operation, a read-back signal. The read-back signal may be a waveform of the written/stored data from the HDA 118.

Figure 4:
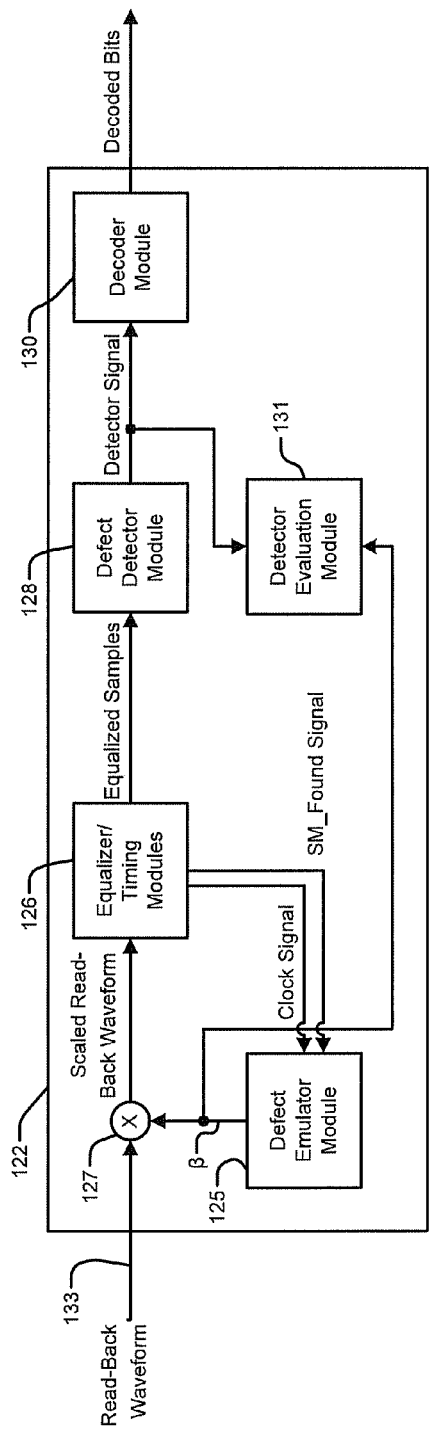
FIG. 4 is a functional block diagram of a read channel module according to the present disclosure.

Referring now to FIG. 4, the read channel module 122 may include a defect emulator module 125 and equalizer and timing modules 126. The read channel module 122 may also include a multiplier 127, a defect detector module 128, a decoder module 130, and a detector evaluation module 131. The detector evaluation module 131 may determine that the defect detector module 128 is properly responding to the sampled/scaled read-back waveform based on defect detector module signals and defect emulator module signals.

An input 133 of the read channel module 122 receives the read-back waveform from the rotating storage medium. The equalizer/timing modules 126 generate clock signals and sync mark (SM) found signals. The defect emulator module 125 modifies the read-back waveform through the multiplier 127 based on the clock and SM found signals. The resultant scaled read-back waveform may be equalized and processed in the equalizer/timing modules 126 and then detected and decoded in detector and decoder modules 128, 130. The decoder module 130 may include a Viterbi decoder.

Figure 5:
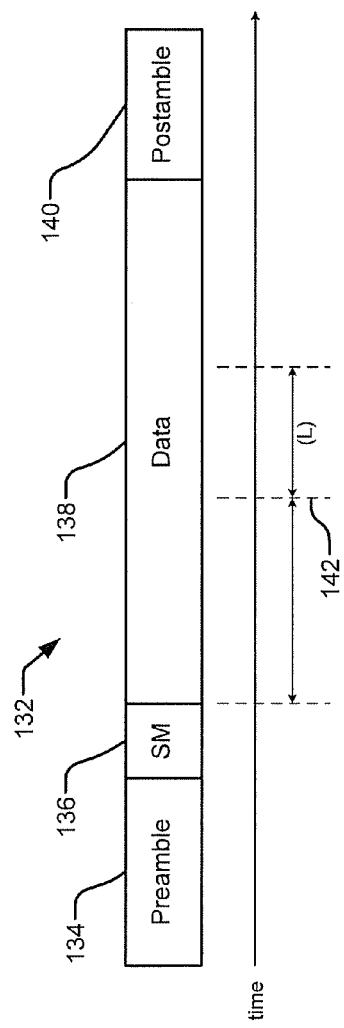
FIG. 5 is a block diagram illustrating timing of a defect inserted into a data sector according to the present disclosure.
Figure 6:
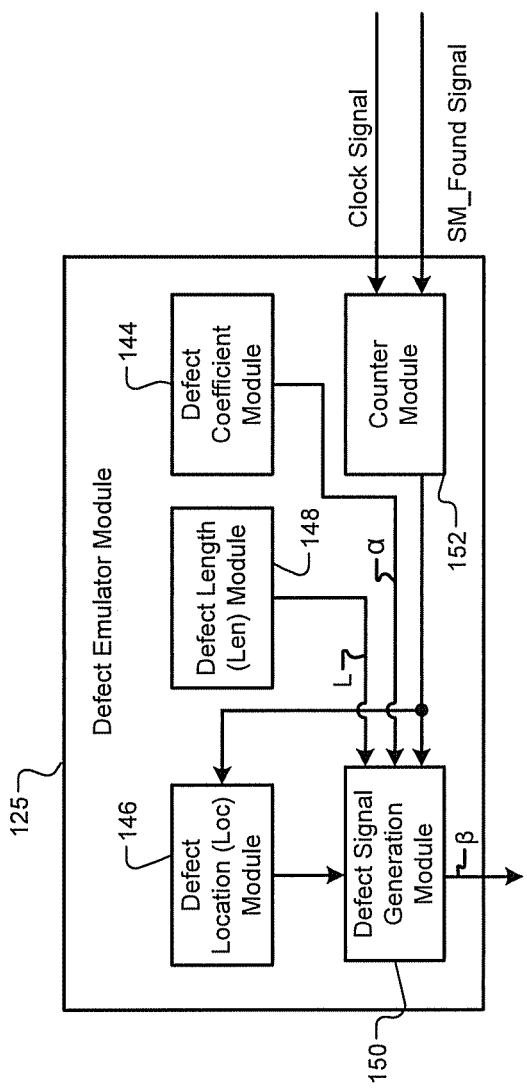
FIG. 6 is a functional block diagram of a defect emulator module according to the present disclosure.
Figure 7:
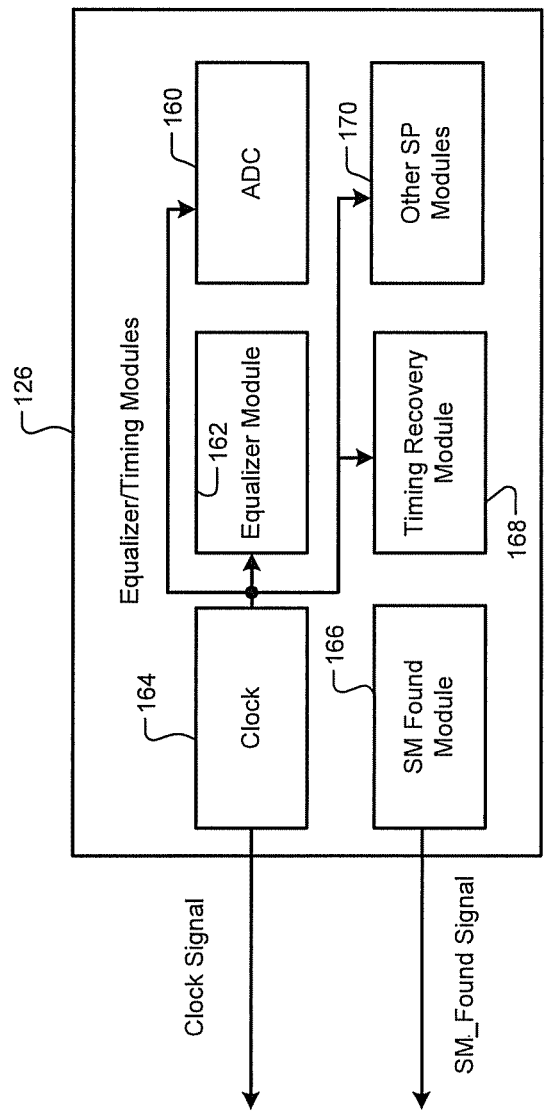
FIG. 7 is a functional block diagram of equalizer and timing modules according to the present disclosure.

Referring now to FIGS. 5-6, the read-back waveform may include a sector of data 132 that includes a preamble field 134, a sync-mark (SM) field 136, a data field 138, and a postamble field 140. The data field 138 and/or all the read-back waveform fields may be partitioned into sub-portions that have known lengths and that may correspond to sample points. The sub-portions may therefore be counted. The preamble field 134, SM field 136, and postamble field 140 may refer to control portions of the read-back waveform, and the data field 138 may refer to a data portion of the read-back waveform.

The defect emulator module 125 may modify the data field 138 by multiplying it with a signal $\beta$ in the multiplier 127. The defect emulator module 125 may control $\beta$ based on a defect coefficient $\alpha$. When $\beta$ does not equal $\alpha$, $\beta$ may equal 1, and effectively a defect is not inserted. $\alpha$ may correspond to a magnitude of the defect. The defect may have a predetermined length L and may be inserted at a predetermined location 142 in the data field 138.

As an illustrative example, the data field 138 has a length defined by 50 sub-portions, the predetermined location 142 corresponds to 20 sub-portions, L is 5 sub-portions, and a has a magnitude of 2. $\beta=1$ until the 20th sub-portion is reached through sampling/counting of sub-portions, and then the defect is inserted for the next 5 sub-portions. Thus, $\beta=\alpha=2$, and those 5 sub-portions of the read-back waveform are multiplied by 2. At the end of the 5 sub-portions, β=1, and the remaining sub-portions of the data field 138 are multiplied by 1.

The defect emulator module 125 may include a defect coefficient module 144, a defect location module 146, a defect length module 148, a defect signal module 150, and a counter module 152. The defect coefficient module 144 operates in defect and non-defect modes. In a non-defect mode, α may equal 1, and in a defect mode, α may equal values other than 1, including 0, and vice versa. Further, α may merely be active (so that β=α) in the defect mode and inactive (so that β=1) in the non-defect mode.

α may be constant or variable for multiple iterations and may represent a particular type of noise. For example, α may gradually decay from an initial value to a final value during defect insertion. The decay may occur from a first to a last sample when α represents a manufacturing defect on the disk. In other words, for first, second, and third sample points on the read-back waveform, α may be 2.0, 1.5, and 1.25 respectively. For fourth, fifth, and sixth sample points, α may be 0.75, 0.50, and 0.25 respectively. Multiple defects may be sampled on a single data wedge or multiple consecutive data wedges. α may also be different for different wedges.

The value of α may change from sample to sample to model various other defect shapes in the read-back waveform. α may, for example, gradually increase from an initial value of 0.25 to a final value of 1.5 during the defect insertion from the first to the last defect sample. α may gradually increase from an initial value of 0.25 to a value of 1.5, and then may decay to a smaller value, for example 0.5, during the defect insertion from the first to the last defect sample. The rate of decay or rate of increase of the defect coefficient α may be variable.

The defect location module 146 may include a bit/symbol index of the defect start location "loc". The defect location module 146 may set user-programmable locations for the defect. The defect length module 148 may determines how long "len" the inserted defect is. The defect length module 148 may set lengths for the defect from an internal random number generator that generates an integer less than the length of the data field 138 and greater than 0. The defect may be measured in terms of bits or symbols. The length of the defect may also be user-programmable.

As mentioned, the defect signal module 150 inserts the defect into the read-back waveform by controlling the value of β. The defect signal module 150 may control the counter module 152 in response to the SM found signal. The SM found signal may indicate the beginning of data transmission and may thus both enable the counter module 152 and signal a counter module reset. In other words, the counter module 152 may reset at SM found and may then count sub-portions/samples of the data field 138 until it reaches the defect location, which is based on defect location module signals. The counter module 152 may include a built-in latency start value to compensate for read channel latencies. Such read channel latencies may include latency of the equalizer/timing modules 126 and the time taken to receive the scaled read-back waveform and generate the SM found signal.

The defect signal module 150 inserts the defect by setting β equal to α. This may occur when the counter module 152 reaches the start location. The start location is determined by the defect location module 146. Defect insertion/scaling ends when the counter module value reaches the start location plus the length of the defect. Multiple defects may be inserted into the same sector based on multiple start locations and multiple defect lengths.

The equalizer/timing modules 126 may include an analog to digital converter (ADC) 160, an equalizer module 162, a clock 164, an SM found module 166, a timing recovery module 168, and other signal processing modules 170.

The clock 164 locks the fields (for example, preamble and SM) of the read-back waveform to a clock signal. The timing recovery module 168 may compensate for slowly changing timing distortions of the HDD. The timing recovery module 168 may therefore maintain the relationship between recorded data and the read-back signal by continually adjusting the frequency and phase of the clock 164. The equalizer module 162 may adjust specific frequencies in the read-back signal to compensate for loss and distortion during signal transmission. The SM found module 166 detects the SM in the read-back waveform and generates the SM found signal. The defect emulator module 125 may insert the defect in the read-back waveform before or after any of analog-to-digital conversion, timing recovery, and equalization.

Referring again to FIG. 3, the HDD PCB 114 also includes a buffer memory 232, a nonvolatile memory 234, a processor 236, and a spindle/voice-coil motor (VCM) driver module 238. The HDD control module 112 controls components of the HDA 118 and communicates with an external device, such as the host system, via an I/O interface 240. The I/O interface 240 may communicate with the host system via an advanced technology attachment (ATA) bus 244. The host system may include a computer, a multimedia device, a mobile computing device, etc. The I/O interface 240 may include wireline and/or wireless communication links.

The HDD control module 112 may receive data from the HDA 118, the read/write channel modules 122, 123, the buffer memory 232, the nonvolatile memory 234, the processor 236, the spindle/VCM driver module 238, and/or the I/O interface 240. The read/write channel modules 122, 123 and the spindle/VCM driver module 238 communicate with the HDA 118 via HDA conductors 246. As mentioned, the read channel module 122 may process the data, including encoding, decoding, filtering, and/or formatting. The processed data may be received by the HDD control module 112 and output to the HDA 118, the buffer memory 232, the nonvolatile memory 234, the processor 236, the spindle/VCM driver module 238, and/or the I/O interface 240.

The HDD control module 112 may use the buffer memory 232 and/or the nonvolatile memory 234 to store data related to the control and operation of the HDD 110. The buffer memory 232 may include dynamic random access memory (DRAM), synchronous DRAM (SDRAM), and/or other memory types.

The nonvolatile memory 234 may include flash memory (including NAND and NOR flash memory), phase change memory, magnetic RAM, and/or multi-state memory, in which each memory cell has more than two states. The spindle/VCM driver module 238 controls a spindle motor 250 and a VCM 251. The HDD PCB 114 also includes a power supply 252 that provides power to the components of the HDD 110.

The HDA 118 includes the rotating storage medium 120. The HDA 118 further includes a read/write device, such a read/write head 253. The read/write device may be arranged on an actuator arm 254, as shown, and read and write data on the rotating storage medium 120. The spindle motor 250 rotates the rotating storage medium 120 and the VCM 251 actuates the actuator arm 254. A preamplifier device 256 amplifies signals generated by the read/write device during read operations and provides signals to the read/write device during write operations.

Figure 8:
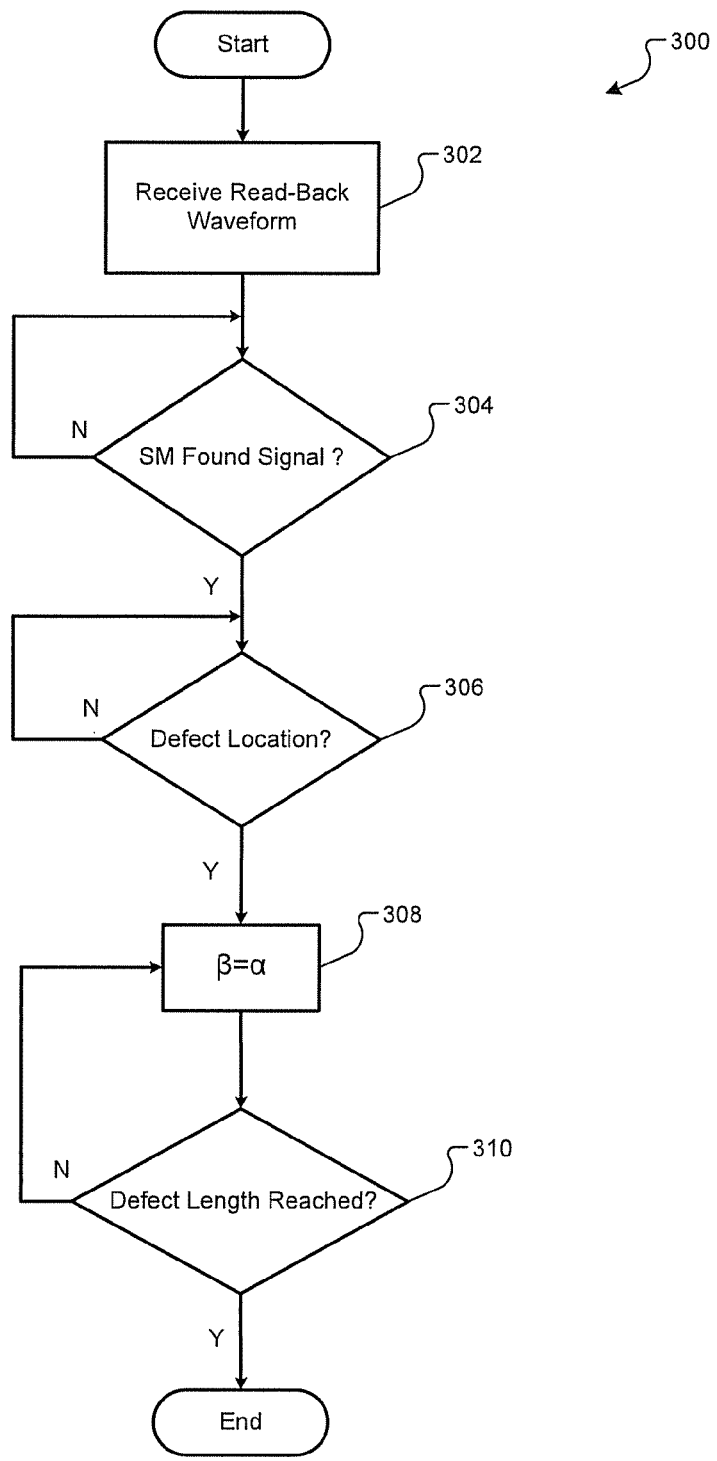
FIG. 8 is a block diagram illustrating operations of the read channel module according to the present disclosure.

Referring now to FIG. 8, a block diagram 300 illustrates operation of the read channel module according to the present disclosure. Control starts in step 302 when a read-back waveform is received in the read channel module. If the SM found signal is received in the defect emulator module in step 304, β=1 is set for successive samples of the read-back waveform until the defect location is reached in step 306. In step 308, the defect is inserted in the read-back waveform so that β=α is set for successive samples until the end/length of the defect is reached in step 310. β then equals 1 unless or until another defect is inserted.

Figure 9:
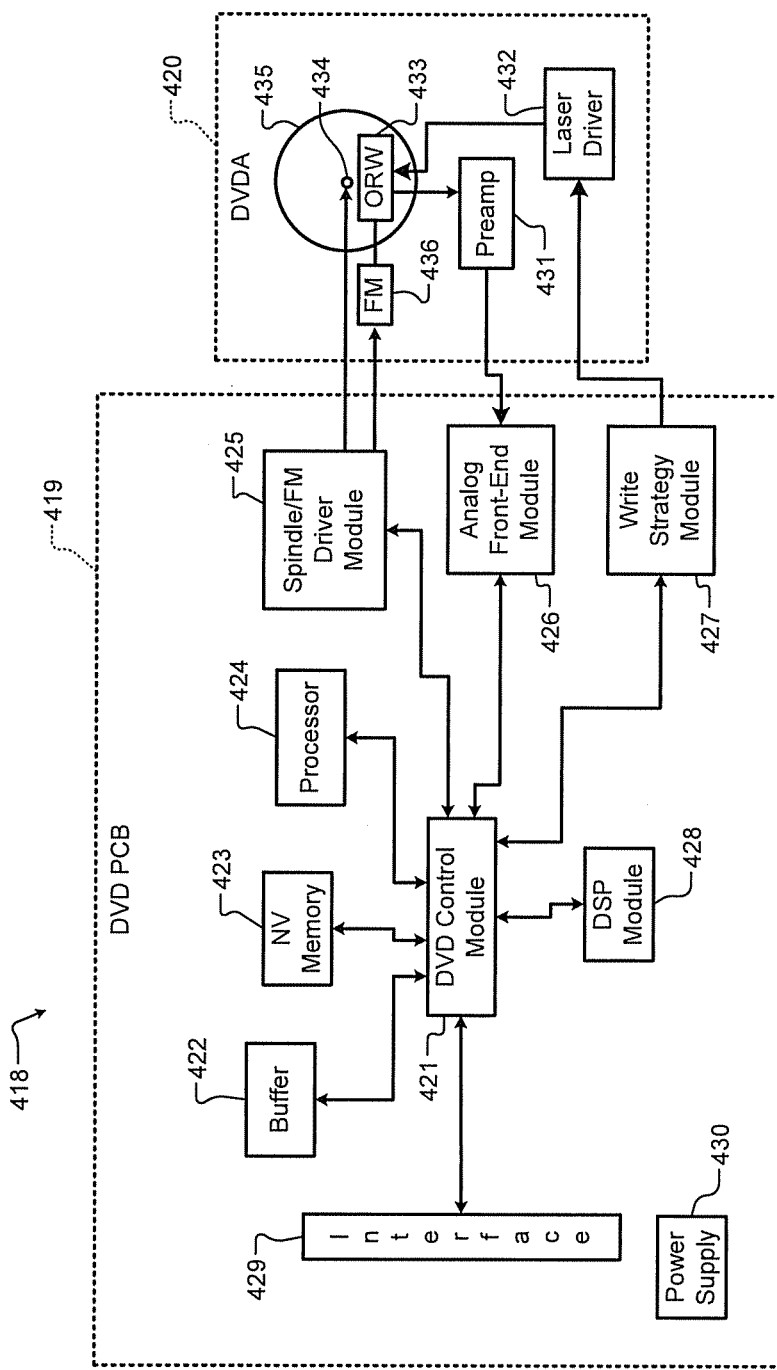
FIG. 9 is a functional block diagram of a digital versatile disk (DVD) drive.

Referring now to FIG. 9, a functional block diagram of a DVD drive is shown. The teachings of the disclosure can be implemented in an analog front-end module of a DVD drive 418 or of a CD drive (not shown) or other optical drive. The DVD control module 421 may include and perform synchronization of servo numbers in a disk formatter module and a DWFT as above described. The DVD drive 418 includes a DVD PCB 419 and a DVD assembly (DVDA) 420. The DVD PCB 419 includes a DVD control module 421, a buffer 422, nonvolatile memory 423, a processor 424, a spindle/FM (feed motor) driver module 425, an analog front-end module 426, a write strategy module 427, and a DSP module 428.

The DVD control module 421 controls components of the DVDA 420 and communicates with an external device (not shown) via an I/O interface 429. The external device may include a computer, a multimedia device, a mobile computing device, etc. The I/O interface 429 may include wireline and/or wireless communication links.

The DVD control module 421 may receive data from the buffer 422, nonvolatile memory 423, the processor 424, the spindle/FM driver module 425, the analog front-end module 426, the write strategy module 427, the DSP module 428, and/or the I/O interface 429. The processor 424 may process the data, including encoding, decoding, filtering, and/or formatting. The DSP module 428 performs signal processing, such as video and/or audio coding/decoding. The processed data may be output to the buffer 422, nonvolatile memory 423, the processor 424, the spindle/FM driver module 425, the analog front-end module 426, the write strategy module 427, the DSP module 428, and/or the I/O interface 429.

The DVD control module 421 may use the buffer 422 and/or nonvolatile memory 423 to store data related to the control and operation of the DVD drive 418. The buffer 422 may include DRAM, SDRAM, etc. The nonvolatile memory 423 may include flash memory (including NAND and NOR flash memory), phase change memory, magnetic RAM, or multi-state memory, in which each memory cell has more than two states. The DVD PCB 419 includes a power supply 430 that provides power to the components of the DVD drive 418.

The DVDA 420 may include a preamplifier device 431, a laser driver 432, and an optical device 433, which may be an optical read/write (ORW) device or an optical read-only (OR) device. A spindle motor 434 rotates an optical storage medium 435, and a feed motor 436 actuates the optical device 433 relative to the optical storage medium 435.

When reading data from the optical storage medium 435, the laser driver provides a read power to the optical device 433. The optical device 433 detects data from the optical storage medium 435, and transmits the data to the preamplifier device 431. The analog front-end module 426 receives data from the preamplifier device 431 and performs such functions as filtering and A/D conversion. To write to the optical storage medium 435, the write strategy module 427 transmits power level and timing data to the laser driver 432. The laser driver 432 controls the optical device 433 to write data to the optical storage medium 435.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A read channel module comprising:
   an input configured to receive a read-back signal generated by a read head, wherein the read-back signal is generated by the read head based on a reading from a rotating storage medium;
   a location module configured to determine a location to insert a first imitation defect within the read-back signal, wherein the first imitation defect imitates a first defect; and
   a generation module configured to
   selectively generate the first imitation defect, and
   insert the first imitation defect in the read-back signal at the determined location.

2. The read channel module of claim 1, the location module is configured to determine the location at which the first imitation defect is to be inserted within the read-back signal, such that the location is a random location.

3. The read channel module of claim 1, wherein:
   the read-back signal comprises (i) control data, and (ii) data other than control data; and
   the generation module is configured to modify the data other than control data when inserting the first imitation defect in the read-back signal.

4. The read channel module of claim 1, further comprising a coefficient module configured to generate a first coefficient, wherein:
   the first coefficient corresponds to a characteristic of the first defect; and
   the generation module is configured to modify the read-back signal based on the first coefficient when inserting the first imitation defect.

5. The read channel module of claim 4, further comprising a sync-mark module configured to (i) monitor the read-back signal, and (ii) generate a sync-mark signal indicating when a sync-mark is detected, wherein:
   the generation module is configured to modify the read-back signal with the first coefficient (i) starting when the sync-mark is detected, and (ii) ending a predetermined period after the sync-mark is detected; and
   the predetermined period corresponds to a length of the first defect.

6. The read channel module of claim 5, wherein the length of the first defect is a random length.

7. The read channel module of claim 4, wherein a magnitude of the first coefficient varies during a period of the first imitation defect.

8. The read channel module of claim 4, wherein:
   the location module is configured to determine a location at which a second imitation defect is to be inserted within the read-back signal, wherein the second imitation defect imitates a second defect; and
   the generation module is configured to (i) modify a first portion of the read-back signal to imitate the first defect, and (ii) modify a second portion of the read-back signal to imitate the second defect.

9. The read channel module of claim 8, wherein:
the coefficient module is configured to generate a second coefficient for the second defect; and
the generation module is configured to modify the read-back signal based on the second coefficient when inserting the second imitation defect.

10. The read channel module of claim 1, further comprising a sync-mark module configured to generate a sync-mark signal, wherein:
the sync-mark signal indicates a sync-mark has been found; and
the generation module is configured to insert the first imitation defect in the read-back signal based on the sync-mark signal.

11. The read channel module of claim 1, further comprising:
a defect detector module configured to detect the first imitation defect; and
an evaluation module configured to evaluate performance of the defect detector module based on (i) an output of the defect detector module, and (ii) an output of the generation module.

12. A method comprising:
receiving a read-back signal generated by a read head, wherein the read-signal is generated by the read head based on a reading from a rotating storage medium;
determining a location to insert a first imitation defect within the read-back signal, wherein the first imitation defect imitates a first defect;
selectively generating the first imitation defect; and
inserting the first imitation defect in the read-back signal at the determined location.

13. The method of claim 12, comprising modifying data other than control data when inserting the first imitation defect in the read-back signal, wherein the read-back signal comprises (i) control data, and (ii) the data other than control data.

14. The method of claim 12, further comprising generating a first coefficient, wherein the first coefficient corresponds to a characteristic of the first defect,
wherein the inserting of the first imitation defect in the read-back signal comprises modifying the read-back signal based on the first coefficient.

15. The method of claim 14, further comprising:
monitoring the read-back signal; and
generating a sync-mark signal indicating when a sync-mark is detected,
wherein
the inserting of the first imitation defect in the read-back signal comprises modifying the read-back signal with the first coefficient (i) starting when the sync-mark is detected, and (ii) ending a predetermined period after the sync-mark is detected, and
the predetermined period corresponds to a length of the first defect.

16. The method of claim 14, wherein a magnitude of the first coefficient varies during a period of the first imitation defect.

17. The method of claim 14, further comprising:
determine a location at which a second imitation defect is to be inserted within the read-back signal, wherein the second imitation defect imitates a second defect,
wherein the inserting of the first imitation defect includes modifying a first portion of the read-back signal to imitate the first defect; and
modifying a second portion of the read-back signal to imitate the second defect.

18. The method of claim 17, further comprising generating a second coefficient for the second defect,
wherein the modifying of the second portion of the read-back signal is based on the second coefficient.

19. The method of claim 18, further comprising generating a sync-mark signal, wherein:
the sync-mark signal indicates a sync-mark has been found; and
the first imitation defect is inserted in the read-back signal based on the sync-mark signal.

20. The method of claim 12, further comprising:
detecting the first imitation defect via a defect detector module; and
evaluating performance of the defect detector module based on (i) an output of the defect detector module, and (ii) the first imitation defect.

* * * * *